UNITED STATES PATENT OFFICE.

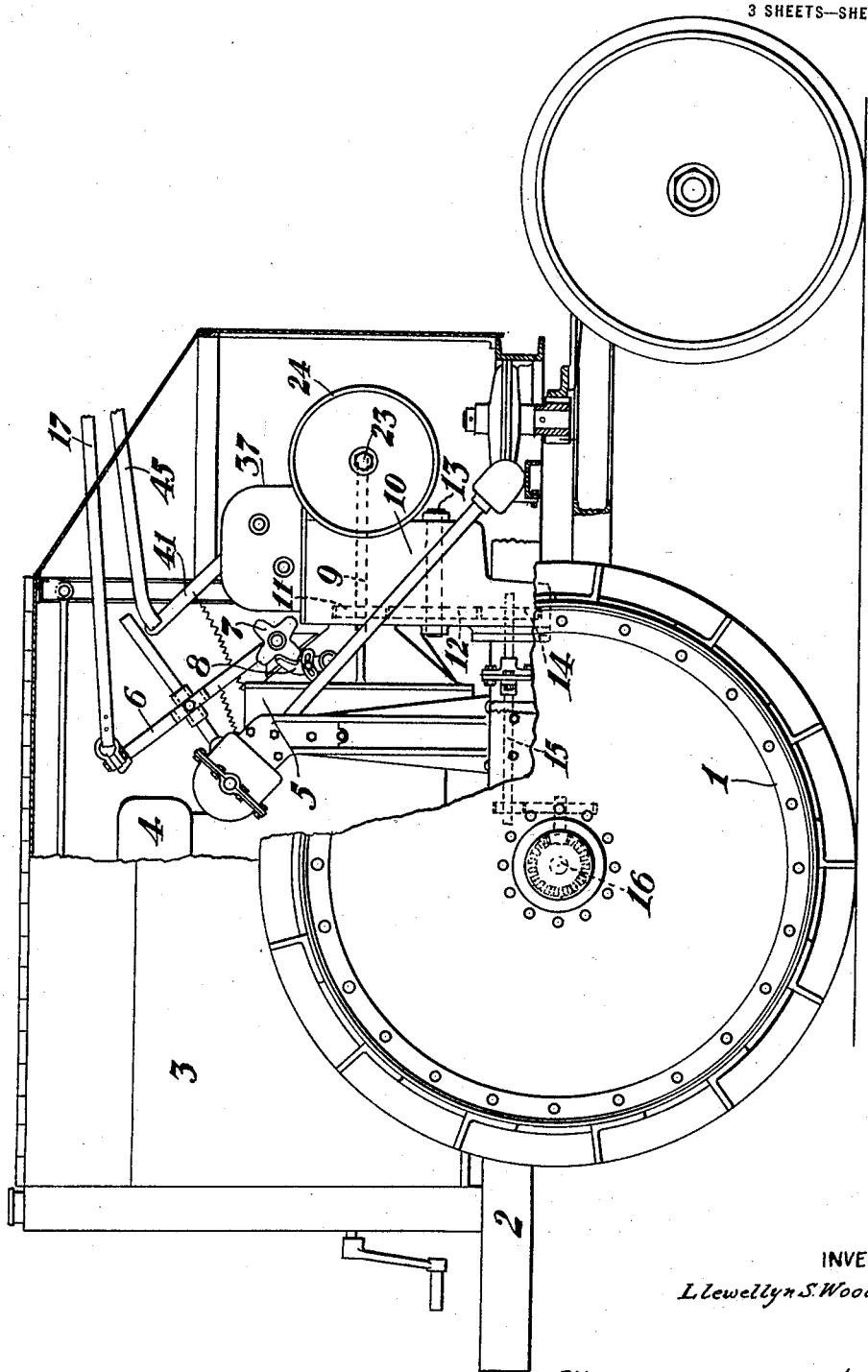

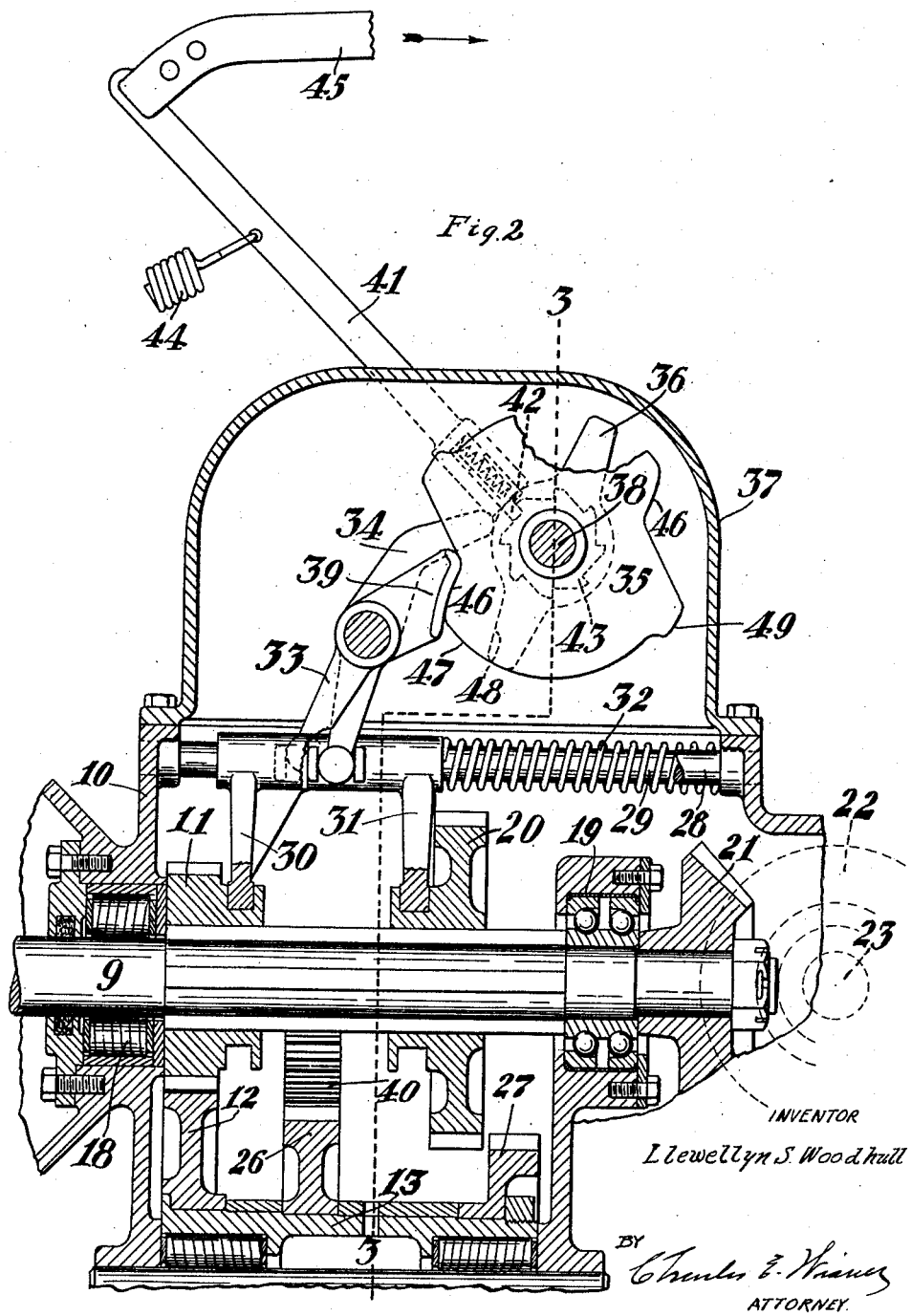

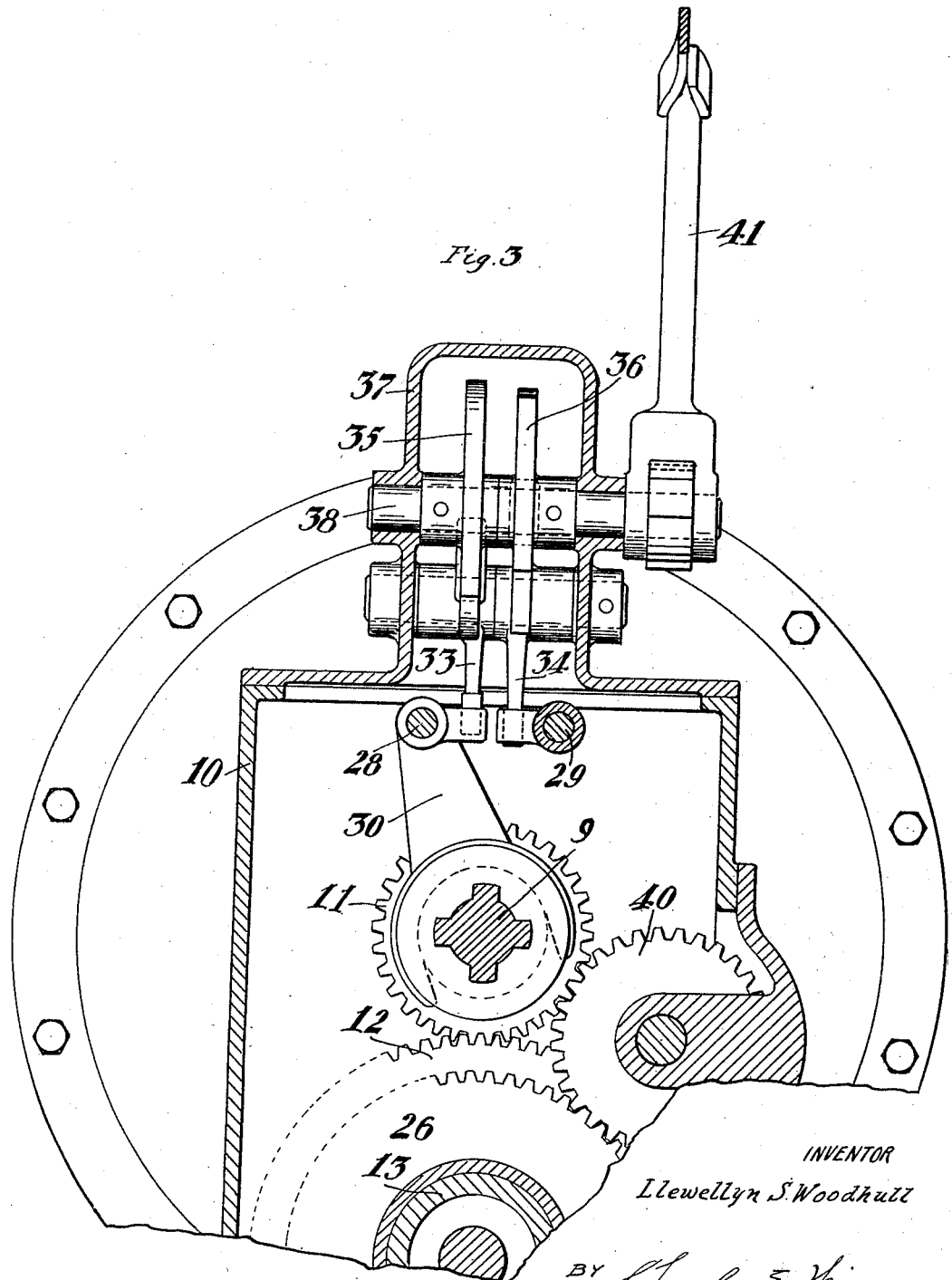

LLEWELLYN S. WOODHULL, OF DETROIT, MICHIGAN, ASSIGNOR, BY MESNE ASSIGNMENTS, TO THE AUTOMOTIVE CORPORATION, OF TOLEDO, OHIO, A CORPORATION OF DELAWARE.

LINE-CONTROLLED TRACTOR.

1,400,494.  Specification of Letters Patent.  Patented Dec. 13, 1921.

Application filed March 6, 1919. Serial No. 281,034.

*To all whom it may concern:*

Be it known that I, LLEWELLYN S. WOODHULL, a citizen of the United States, residing at Detroit, county of Wayne, State of Michigan, have invented a certain new and useful Improvement in Line-Controlled Tractors, and declare the following to be a full, clear, and exact description of the same, such as will enable others skilled in the art to which it pertains to make and use the same, reference being had to the accompanying drawings, which form a part of this specification.

This invention relates to line drive tractors more particularly to provide mechanism operable by a line by which the tractor may be controlled by the operator from the load or trailing apparatus, and the principal object of the invention is to provide a speed-changing power transmission device adapted to be controlled by a line or cable from a distance. An additional object is a speed-changing power transmission device having sliding gears to produce forward and reverse motion of the vehicle controlled by movement in one direction by a line operated lever and moved in the opposite direction by a spring when released by the lever. Another object of the invention is to provide a speed-changing power transmission device having low and high speed gears and reverse gear with shifting mechanism controlled in sequence by similar operations of a line-operated lever. More specifically, the invention seeks to provide means whereby successive pulls on a line perform the following function—namely, first shifts the low speed gear to neutral, then engages the high speed gear, then disengages the high speed gear and sets the reverse gear and then release the reverse and engage the low speed gears. The objects and the several novel features of the invention are hereinafter more fully described and claimed and shown in the preferred form in the accompanying drawings in which—

Figure 1 is a side elevation partly in section of a line drive tractor embodying my invention.

Fig. 2 is a vertical section taken longitudinally of the driving shaft of the speed-changing power transmission device.

Fig. 3 is a vertical section taken on line 3—3 of Fig. 2.

The tractor here shown is of the usual form having a pair of driving wheels 1 on opposite sides of the main framework 2. Within the hood 3 is an internal combustion engine 4 at the rear end of the case of which is a clutch case 5. In this case is the usual clutch device which is controlled by line drive mechanism including a pivoted lever 6 and a star wheel 7 adapted to actuate the clutch lever 8 to engage and disengage the clutch. Engagement of the clutch causes operation of a shaft 9 in axial alinement with the engine shaft (not here shown). The shaft 9 is the main shaft of a speed-changing power transmission device contained in the case 10. The drive to the wheels 1 is by means of a gear 11 on the main shaft, which gear is movable as is hereinafter described, which drives a gear 12 on the counter shaft 13 and this in turn drives a gear 14 on a shaft 15 mounted in the framework and connected by a train of gearing indicated by dotted lines in Fig. 1 with a differential on the shaft 16 for the wheels 1.

The steering of the apparatus is controlled through the lever 6 to which is connected the line 17 but, as this steering apparatus forms no part of this present invention, a description thereof is deemed unnecessary. The gear shifting mechanism is supported within the casing 10 into which the shaft 9 projects being supported therein by a bearing 18 at the forward end of the case and a bearing 19 near the rear end. This shaft is continuously driven by the motor on engagement of the clutch in the usual manner and this shaft has splined thereon a gear 11 and a gear 20. Also at the rear end of the shaft is provided a bevel gear 21 which meshes with a bevel gear 22 shown by dotted lines in Fig. 2 on the shaft 23 extending at a right angle to the shaft 9 as will be understood from Fig. 1. This shaft 23 is continuously driven by the shaft 9 and on the outer end of the shaft 23 is provided a belt wheel 24 by means of which the power of the tractor may be applied when desired to operate various power driven appliances.

In the case 10 is also provided a counter shaft 13 secured to which are the gears 12, 26 and 27, rotation of the shaft simultaneously rotating all of the said gears. As will be understood from Figs. 2 and 3, at the upper end of the case is mounted a pair of rods 28 and 29 and on these rods are provided respectively the shifting forks 30 and 31 and springs 32 are provided on each rod engaging the hubs of the forks on the rods and tending to force them to the position shown in Fig. 2. A pivoted lever 33 is provided having an end in engagement with the fork member 30 and a pivoted lever 34 is provided having an end engaging the fork member 31. A pair of cam members 35 and 36 are provided in the upper housing 37 mounted on the case, which cam members are secured in fixed relation on the cross shaft 38 in the said housing. The lever 33 has an end 39 engaging the cam member 35 and the lever 34 has an end riding on the cam member 36 and rotation of these cam members as is hereinafter described operates the sliding gears in the desired sequence. The case 10 has independently mounted therein an idler gear 40 continuously in mesh with the gear 26 on the counter shaft, which gear 26 is less in diameter than the gear 12. The gear 11 is adapted to be moved from the position shown in Fig. 2 to a position between the gears 12 and 26 which is its idle or neutral position and, from the said position is moved into engagement with the gear 40. When in engagement with the gear 40 rotation of the gear 11 drives the counter shaft in the reverse direction from that when in engagement with the gear 12, and this movement of the gear 11 is occasioned by revolution of the cam member 35. Likewise the gear 20 is slidable on the shaft 9 through operation of the lever 34 which operation is from the neutral position shown in Fig. 2 into engagement with the gear 27 and then to neutral. It is to be noted that the cam mechanism is such that the lever 34 may not be actuated to engage the gears 20 and 27 except when the gear 11 is in neutral position.

The construction and operation of the cam device, by continued rotation of which the desired sequential operation of the gears is accomplished, will be readily understood from the following. The cam shaft 38 is intermittently rotated by means of the lever 41 pivoted on the shaft outside of the case and having a spring-pressed dog 42 engaging the ratchet 43 attached to the shaft. The lever is normally held in position shown in Fig. 2 by means of a coiled spring 44 and to the end of this lever is attached a line 45. With the parts positioned as shown in Fig. 2, pulling on the said line 45 moves the lever in the direction indicated by the arrow and turns the low part 46 of the cam 35 from beneath the end 39 of the lever 33, the nose of which is then forced to ride on a higher part 47 of the said cam. The construction is such that this movement draws the gear 11 to neutral position between the gears 12 and 40 and also this movement of the shaft 38 turns the high part 48 of the cam 36 to position practically in contact with the bent end of the lever 34. The movement of the lever 41 preferably is limited in order that the cams may not overthrow and this limitation may be provided by a stop device of any approved character (not here shown). It is to be noted that the high part 47 of the cam 35 is of considerable extent relative to the extent of high part 48 of the cam 36 and after this first movement of the lever and shifting of the gear 11 as described, the line may be released to return movement by its spring and the shifted gear remains in neutral position. A succeeding operation of the line 45 and oscillation of the lever 41 causes the high part 48 of the cam 36 to actuate the lever 34 sliding the gear 20 into mesh with the gear 27. At the finish of this movement of the lever 41 the high point of the cam 48 remains in engagement with the end of the lever 34 and thus, on release of the line 45 return of the lever 41 to the normal position, the gear 20 remains in mesh with the gear 27 and the counter shaft is driven at the high rate of speed. It is to be noted that rotation of the counter shaft drives the vehicle through the gear 12 and gear train shown by dotted lines in Fig. 1. The next succeeding movement of the lever 41 withdraws the cam 48 from beneath the end of the lever which releases the shifting fork 31 to action by its spring 32 withdrawing the gear 20 from engagement with the gear 27 and bringing the lever 34 to original position and with the gear 11 still maintained in neutral position by the high part 47 of the cam 35. A succeeding movement of the lever 41 then brings the highest point of the cam 35 beneath the end 39 of the lever 33 and this shifts the gear 11 to engagement with the reverse gear 40 causing a reverse rotation of the counter shaft which position will be maintained upon release of the lever 41. By again pulling upon the line 45 the high point 49 is removed from beneath the end of the lever 33 allowing the lever to again fall upon the succeeding low part 46 of the cam 35 bringing the lever 33 and gear 11 to position shown in Fig. 2 which is the low speed position. From this relationship of cams and form thereof, successive operation of the line 45 and lever 41 produces the desired sequential operation of the change-speed gears, the cams moving the gears in one direction and the springs 32 sliding the gears in the opposite direction when released by the cams and thus an efficient and serviceable line-operated gear shifting device is provided that is of the simplest type in operation and similar in all practical respects to the gear shift now used in an ordinary automobile. The sequence of operation is slightly different from the usual gear shift in the automobile in that the sequence of the shift is fixed being from low to neutral, to high, to neutral, to reverse, and finally to low speed, and this operation is simply repeated by repeated revolutions of the cam shaft. This specific sequential operation of the shifting gears, however, may be varied to suit various conditions and arrangements of the transmission device.

It is to be noted that the gear shifting line is independent of the steering line connected with the steering lever 6 and therefore, that in this described relationship of parts the steering of the apparatus and gear shifting apparatus are in nowise dependent for operation one upon the other. Thus, the shifting lever may be operated at any and all times independently of the steering control.

Having thus described my invention, what I claim is—

1. A line operated gear shifting device for automotive vehicles comprising a drive shaft and a counter shaft, a series of gears slidably mounted on the driving shaft adapted for engagement with companion gears on the counter shaft, a spring returned shifting device for each of said gears, a cam for each of the shifting devices, the said cams being rotatable as a unit and shaped to cause sequential operation of the shifting devices, and a line operated, spring-returned lever for turning the cam device.

2. A line-operated gear shifting device for automotive vehicles comprising the combination with a drive shaft and a counter shaft, of a low speed and a high speed gear slidably mounted on the drive shaft and adapted for engagement with companion gears on the counter shaft, a reverse gear and a gear on the counter shaft with which the reverse continuously engages, the low speed gear being adapted for engagement with the said reverse gear, gear shifting levers, spring means for holding the shifting levers in predetermined position, an oscillatable lever, a spring for oscillating the lever in one direction and a line for operating the said lever in the other direction, and means actuated by the lever whereby successive operations of the line causes sequential operation of the slidable gears.

3. A line-operated gear shifting device for automotive vehicles comprising the combination with a drive shaft and a counter shaft, of a low speed and a high speed gear slidable on the drive shaft adapted for engagement with companion gears on the counter shaft, a reverse gear, a gear on the counter shaft continuously in mesh with the reverse gear, the low speed gear being adapted to engage the said reverse gear, gear shifting levers for the said slidable gears, a spring-adapted to yieldably hold each gear in predetermined position, a cam for each of the said levers operating the same against the tension of the springs, and means for intermittently turning the cams to cause predetermined sequential operation of the slidable gears.

4. In speed changing power transmission apparatus, a driven element, a series of gears by means of which the speed of operation of the driven element may be increased or diminished, a cam for each of the gears continuously rotatable to cause sequential operation of the gears, and a line operated spring-returned lever for intermittently turning the cams.

5. In a speed-changing power transmission device, slidable gears, and means for operating the gears in sequence comprising a rotatable cam for each gear, a gear shifting lever engaging each cam, and a line actuated spring return member for intermittently turning the cam members to a predetermined extent.

6. In a speed-changing transmission device, a series of slidable gears, a rotatable cam for each gear, a shaft on which the cams are held in fixed relative position, a shifting lever for each gear engaging the cam being of a shape so that rotation thereof causes the desired movement of the gear and the form of the cams and relationship thereof causing the desired sequential operation of the gears, and means for turning the cam shaft intermittently to a predetermined extent.

7. In a speed-changing, power transmission device, the combination with a driven element, of a driving element, a series of gears slidable on the driving element, a series of gears on the driven element with which the said slidable gears on the driving element are adapted to mesh, a cam for each slidable gear, a shaft on which the cams are mounted in fixed relative relation, a lever for each slidable gear engaging the companion cam, rotation of the cam shaft causing sequential operation of the gears, and a reverse gear with which one of said sliding gears is adapted to engage during rotation of the companion cam.

8. A gear shifting device comprising the combination with a slidable gear, of a lever for moving the same, a spring by means of which the gear is maintained in normal position and an intermittently rotatable cam for operating the lever, the shape of the cam being of a character to actuate the lever and move the gear in the desired manner and then release the gear to movement by the spring.

9. A gear shifting device comprising the combination with a plurality of slidable gears, of a lever for each gear adapted to move the same, a spring for each lever by means of which the companion gear is maintained in normal position, a cam for operating each lever, the series of cams being secured in fixed relative position, the shape of each cam being such as to actuate the lever and move the gear to a predetermined extent and thereafter release the gear to movement by its spring, and means for intermittently rotating the series of cams.

10. In a speed-changing power transmission device, the combination with a driving and a driven element, of a plurality of gears slidable on the driving element, a gear or gears on the driven element with which each slidable gear is adapted to mesh, a lever for moving each slidable gear, a spring for each lever tending to hold the lever and gear in normal position, a cam for each lever of a shape whereby intermittent rotative movement of the cam causes the gear to traverse a predetermined path in a predetermined manner from normal and release it to return movement to normal by the respective spring, the several cams being mounted in fixed relative position, a spring-returned pivoted lever for actuating the cams intermittently, a ratchet in fixed relation with the cams, a spring-pressed pawl carried by the lever, and a line attached to the lever for operating the same from a distance.

In testimony whereof, I sign this specification.

LLEWELLYN S. WOODHULL.